March 5, 1957   J. F. NICKLAS   2,783,739
POULTRY FEEDER
Filed April 13, 1954
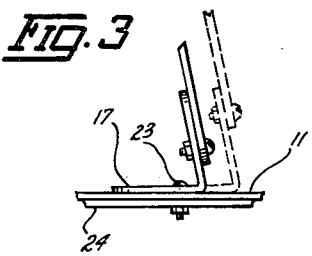
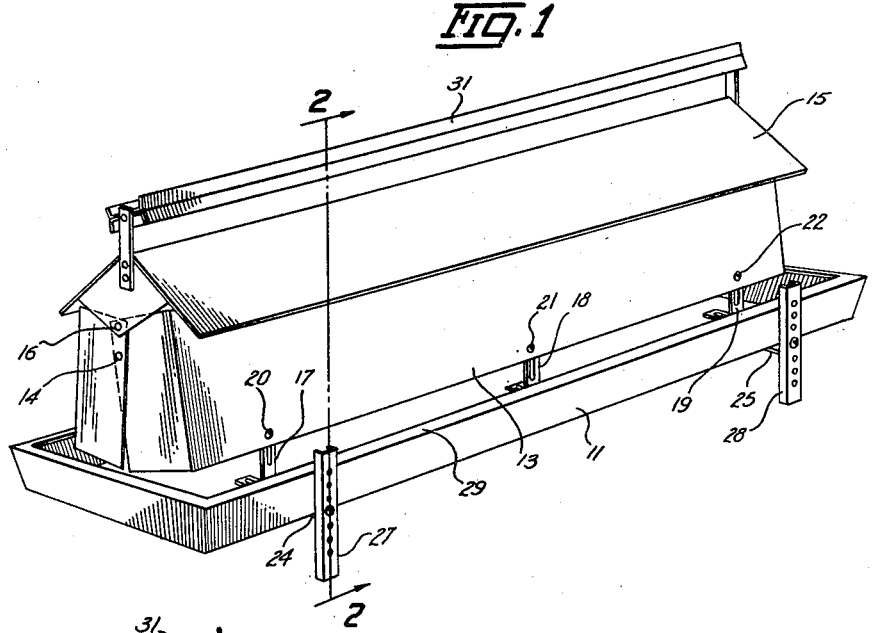
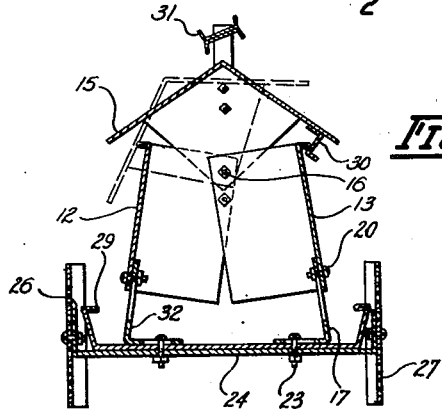
INVENTOR.
JULIUS F. NICKLAS
BY Flournoy Corey
ATTORNEY.

United States Patent Office 2,783,739
Patented Mar. 5, 1957

2,783,739

POULTRY FEEDER

Julius F. Nicklas, Guernsey, Iowa

Application April 13, 1954, Serial No. 422,751

4 Claims. (Cl. 119—52)

This invention relates to a poultry feeder and has particular relation to a feeder which is adjustable in both elevation of the feeder and in the width of the hopper.

It is common practice for poultry raisers to feed their flocks from sheet metal or wooden poultry feeders. During the growth of the flock, various size feeders are employed as the birds become larger and more active. If it is desirable to change from one type of fowl to another, as from chickens to turkeys, then different size feeders are utilized; in any event, a feeder of fixed size must be abandoned at some stage of the growing cycle.

It is also common practice to use various types, sizes and consistencies of feed in raising the flock. Each type of feed may require a different type of feeder or considerable waste of feed is experienced.

It is therefore one of the primary objects of my invention to provide a feeder which may be used throughout the growing cycle of any given poultry flock.

It is a further object of my invention to provide a feeder which may be adjusted to provide a varying size opening or gate to accommodate different types of feed.

It is still a further object of my invention to provide a feeder of such construction as to prevent the poultry from spilling feed as they consume it.

It is still a further object of my invention to provide a feeder which may be elevated at varying distances above the ground to adapt the feeder to varying adjustments as to capacity and the like.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in perspective of a poultry feeder constructed according to one embodiment of my invention.

Figure 2 is a cross sectional view taken at line 2—2 in the center portion of Figure 1 to disclose the adjustable means therein.

Figure 3 is an enlarged sectional view of the adjustable bracket portion of the feeder showing the two extreme positions possible, the second position being shown by dotted lines.

Referring now to the drawings and particularly to Figure 1, a feeder constructed according to my invention consists of a base member or pan 11, two substantially box-like side members 12 and 13 supported in the pan and pivotally joined together at 14 to form a hopper. A roof member 15 positioned above the side walls and pivotally attached to one of these walls at 16 completes the hopper.

It will be noted that the side members or walls of the hopper are supported by three brackets 17, 18 and 19. A similar set of brackets are positioned on the opposite side of the feeder. These brackets are all of angular construction and have a slotted portion in each leg of the angle. These slots extend for a considerable portion of the leg and are adapted to receive stove bolts 20, 21 and 22 which in turn extend through the wall member 13.

The other leg of the angle rests in the bottom of the pan member 11 and also has a bolt 23 extending through the slot and through the bottom of the pan.

The end brackets 17 and 19 and their opposite members such as 32 are positioned above a cross brace 24 and 25 respectively. These cross members have upwardly extending end portions such as shown at 26 of Figure 2. These upwardly extending members or ears are adapted to receive channel-like legs 27 and 28. These legs are formed with a plurality of holes to enable the pan 11 to be positioned at varying distances above the ground.

The pan member has an inwardly extending lip 29 around the upper edge thereof to form a feeding trough.

In operation it will be apparent that the adjustable bracket members such as 17, 18 and 19 may be moved inwardly and outwardly in relation to the pan 11. It will also be apparent that the wall members 12 and 13 may be moved up and down at will. This, of course, means that the opening between the lower edge of the side wall and the pan may be varied over a considerable extent which in effect provides a metering gate from the hopper into the feeding trough.

In actual practice such feeds as oats would require a relatively small opening to provide an adequate amount of feed for the fowl. Some of the mash mixtures which do not flow downwardly as easily as oats would require a large opening.

The feed, of course, is expelled at the sides of the pan where the birds may easily reach it. Their feeding may be controlled to some extent by moving the walls of the container inwardly and outwardly to expand or reduce the distance between the side walls and the lip 29. The lip also extending inwardly prevents the poultry from pulling the feed out over the edge of the pan as they consume it, thus reducing the amount of wastage involved in feeding.

A roof member 15 being pivoted to only one wall may be rotated upwardly and outwardly to permit the filling of the central hopper and a latch member 30 permits the roof to be locked in a closed position. To complete the assembly, a rotating bar 31 is positioned on top of the roof gable. Since the edges of the rotating bar are over center in relation to the attaching point, obviously poultry trying to roost on this bar will find it unstable.

In view of the foregoing description, it will be apparent that I have provided a poultry feeder which has a wide range of adjustment both as to types of feed which may be used in it and as to sizes of birds that may be fed.

When the operator is feeding baby chicks he will place the main trough or pan at the lowermost position on the legs. The side walls may be pivoted inwardly toward each other and lowered to the position closest to the pan bottom. In this way the amount of feed introduced will be relatively small.

As the fowl grows, these openings may be enlarged by moving the side walls inwardly and upwardly and the rate of feed increased substantially or, if it is desirable to use the feeder for young turkeys or the like, the necessary adjustment may be readily made.

In this way one feeder will serve the poultry raiser through a major portion if not all of the growing cycle of the individual flock.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a poultry feeder of the type described, a feeding trough, a hopper comprising a pair of side members pivotally attached to each other at the upper portions thereof, and a plurality of angular attaching brackets operatively connecting said side walls and said trough, said angular brackets haivng slots on each leg thereof to provide an adjustment between said hopper and said trough.

2. In a device of the type described, a pan, a hopper comprising a pair of wall members pivotally attached to each other at the upper portions thereof, a plurality of adjustable brackets positioned between said side walls and said pan to permit the vertical and horizontal adjustment of said side walls.

3. In a poultry feeder, a trough, a hopper positioned in said trough, said hopper comprising a pair of wall members pivotally attached to each other at the upper portion thereof, adjustable means between said hopper and said trough to provide both vertical and horizontal movement of said hopper and leg members adjustably attached to said trough to permit the vertical positioning thereof at relatively greater or lesser distances above the ground, and a roof portion positioned above and attached to said wall members at the pivotal point thereof.

4. In a poultry feeder, a hopper the separate side walls thereof being pivotally attached to each other at the uppermost portions thereof, a pan member adapted to be positioned under said hopper, a plurality of adjustable brackets positioned between said pan and said hopper, said brackets comprising two substantially angular leg portions having slots positioned in each leg thereof, one of said slotted legs being operatively connected to the side walls of said hopper and the other slotted leg to the pan to permit an adjustable vertical relationship between said pan and said hopper and a second adjustable horizontal relationship between the opposed walls of said hopper.

References Cited in the file of this patent

UNITED STATES PATENTS

| | | |
|---|---|---|
| 1,027,881 | Mills | May 28, 1912 |
| 1,569,931 | Herrington | Jan. 19, 1926 |
| 2,288,489 | Schmeling | June 30, 1942 |
| 2,543,916 | Lewis | Mar. 6, 1951 |